United States Patent
Balachandran et al.

(10) Patent No.: US 6,895,057 B1
(45) Date of Patent: May 17, 2005

(54) SYSTEM AND METHOD FOR WIRELESS COMMUNICATION SUPPORTING LINK ADAPTATION AND INCREMENTAL REDUNDANCY

(75) Inventors: Krishna Balachandran, Middletown, NJ (US); Richard P. Ejzak, Wheaton, IL (US); Sanjiv Nanda, Clarksburg, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/431,996

(22) Filed: Nov. 2, 1999

Related U.S. Application Data (60) Provisional application No. 60/106,802, filed on Nov. 3, 1998.

(51) Int. Cl.[7] .......................... H04L 5/16; H04L 27/00; H04J 3/16
(52) U.S. Cl. ........................ 375/259; 375/219; 370/465
(58) Field of Search ............................... 375/130, 259, 375/377, 219, 295, 296, 316; 370/465, 310, 337, 470, 474; 327/100; 455/67.1

(56) References Cited

U.S. PATENT DOCUMENTS

| | | | | |
|---|---|---|---|---|
| 5,729,536 A | | 3/1998 | Doshi et al. | |
| 5,950,124 A | * | 9/1999 | Trompower et al. | 455/422 |
| 6,208,663 B1 | * | 3/2001 | Schramm et al. | 370/465 |
| 6,363,058 B1 | * | 3/2002 | Roobol et al. | 370/310 |
| 6,400,928 B1 | * | 6/2002 | Khullar et al. | 455/67.1 |
| 6,501,745 B1 | * | 12/2002 | Turina et al. | 370/337 |
| 6,704,898 B1 | * | 3/2004 | Furuskar et al. | 714/751 |

\* cited by examiner

*Primary Examiner*—Young T. Tse
*Assistant Examiner*—Sam K. Ahn

(57) ABSTRACT

A system and method is provided for communicating in a wireless communication system which supports link adaptation or link adaptation and incremental redundancy. The invention provides link adaptation at multiple code rate by dividing fixed length RLC blocks into coded sub-blocks. CRC code may be appended to the RLC blocks for error detection. The sub-blocks are then grouped into transmission units for transmission. The number of sub-blocks in each group is varied to provide multiple code rates. Headers are used to identify the transmission units being transmitted. In the case of retransmission, the transmission units may be expressly identified through extended headers. One or more of the originally transmitted sub-blocks are dropped and replaced by the extended headers in the retransmission. Accordingly, the present invention provides for a retransmission code rate which may be different from the code rate at which the transmission units were originally transmitted.

37 Claims, 7 Drawing Sheets

SYSTEM AND METHOD FOR WIRELESS COMMUNICATION SUPPORTING LINK ADAPTATION AND INCREMENTAL REDUNDANCY

CROSS REFERENCE TO RELATED APPLICATION

This application claims the benefit of U.S. Provisional Application, Ser. No. 60/106,802, filed Nov. 3, 1998, and entitled "Link Adaptation and Incremental Redundancy for EGPRS".

BACKGROUND OF THE INVENTION

The present invention relates generally to wireless communication networks and, in particular, to method for efficiently providing data communications over an air interface.

This section is intended to introduce the reader to various aspects of art that may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

The widespread growing popularity of the Internet has encouraged wireless communication system developers to continually improve the data communication capabilities of their systems. In response to this need, various standards bodies are formulating new third generation (3G) standards which support higher data rates. For example, standards organizations such as the European Telecommunications Standards Institute (ETSI), the Association of Radio Industries and Broadcasting (ARIB) and the Telecommunications Industry Association (TIA) are continually developing standards to support faster and more efficient wireless communications.

Consequently, the wireless communications industry is developing and implementing new wireless transmission protocols which provide faster, more robust and more efficient data communications over an air interface. For example, general packet radio service (GPRS) has been developed as a packet-switched upgrade for the well known time division multiple access (TDMA) system. In a further advancement in the art, enhanced GPRS (EGPRS) has also been developed.

In order to improve the performance of wireless data communications links, link quality control schemes are being developed. Two known methods for improving robustness of the communications channel are link adaptation and incremental redundancy. Link adaptation is the dynamic selection of modulation and coding schemes based on radio link quality. These methods are often referred to as link quality control. There continues however to be a need in the art for faster, more efficient and more robust methods for transmitting data over an air interface.

This need is met by the method of the present invention wherein both link adaptation and incremental redundancy are capable of being supported and wherein the data is transmitted in an efficient, flexible manner.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below. Since the following is for summary purposes only, none of the aspects present below should be considered essential, or necessary, to the present invention, which is solely defined by the appended claims.

In accordance with one aspect of the present invention, a system and method are disclosed which provide wireless communication capabilities while supporting link adaptation, or link adaptation and incremental redundancy. The invention configures fixed length radio link control blocks into fixed length sub-blocks. These sub-blocks are then configured, or for example, group in various manners to produce transmission units having multiple code rates for link adaptation.

Another aspect of the present invention provides that during retransmission one or more of the sub-blocks are dropped to permit the addition of extended header information in the retransmitted transmission units.

These and other features and advantages of the present invention will become apparent from the following detailed description, the accompanying drawings and the appended claims.

BRIEF DESCRIPTION OF THE DRAWINGS

The foregoing and other advantages of the invention will become apparent upon reading the following detailed description and upon reference to the drawings in which.

DETAILED DESCRIPTION OF THE INVENTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developer's specific goals, such as compliance with system related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
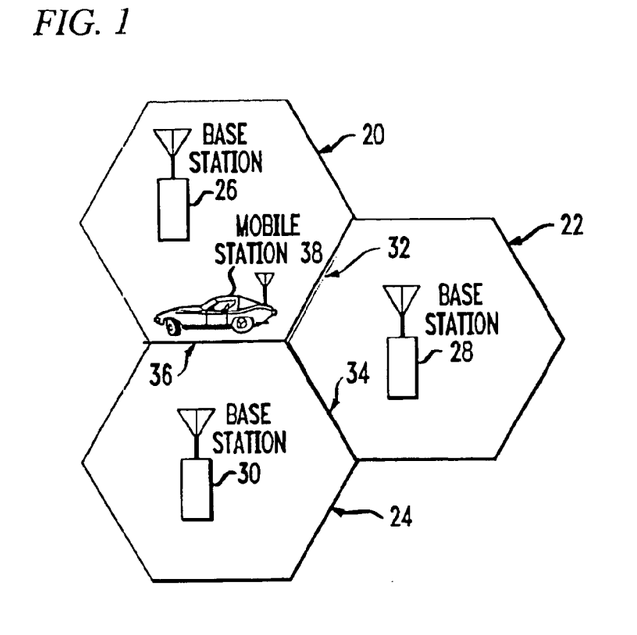
FIG. 1 is a graphical representation of three cell sites within a cluster in a system for wireless communication in accordance with one aspect of the present invention.

Referring now to the drawings and initially to FIG. 1, a system for providing wireless communications supporting link adaptation (LA) and incremental redundancy (IR) in accordance with one aspect of the present invention is shown. A plurality of cells 20, 22, and 24 in a telecommunications system are shown. Consistent with convention, each cell 20, 22, and 24 is shown having a hexagonal cell boundary. Within each cell 20, 22, and 24 are base stations 26, 28, and 30 that are located near the center of the corresponding cell 20, 22, and 24. Specifically, the base station 26 is located within cell 20, base station 28 is located within cell 22, and base station 30 is located within cell 24.

Figure 2:
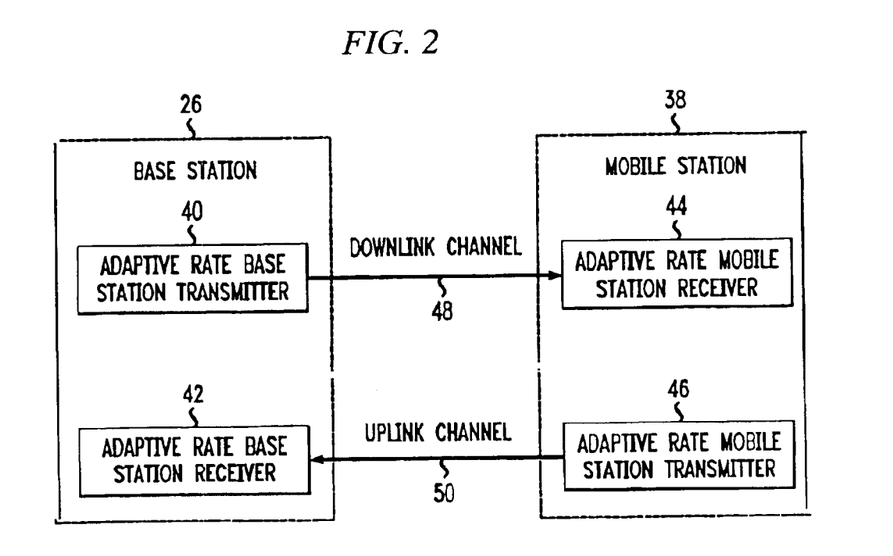
FIG. 2 is a general block diagram of a base station and a mobile station in the system of FIG. 1.

The boundaries 32, 34 and 36 separating the cells 20, 22, and 24 generally represent the points where mobile assisted handoffs occurs. As an example, when a mobile station 38 moves away from base station 26 towards an adjacent base station 28, the signal-to-noise ratio (SNR) from the base station 26 will drop below a certain threshold level past the boundary 32 while, at the same time, the SNR from the second base station 28 increases above this threshold level as the mobile station 38 crosses the boundary 32 into the cell 22. Cellular systems are engineered to provide coverage from each base station up until the cell boundary. Thus, the SNR over a large portion of a cell 20 is sufficient to support higher data rates because the SNR from the base station 26 is greater than the minimum SNR needed to support the data transfer at the boundary 32. FIG. 2 is an example implementation of an adaptive rate system which takes advantage of this support for higher data rates.

FIG. 2 is a block diagram for the schematic of the base station 26 and the mobile station 38 in accordance with the invention. The base station 26 consists of both an adaptive rate base station transmitter 40 and an adaptive rate base station receiver 42. Likewise, the mobile station 38 also consists of both an adaptive rate mobile station receiver 44 and an adaptive rate mobile transmitter 46. Each pair of the transmitter and the receiver, corresponding to either the base station 26 or mobile station 38, are in radio connection via a corresponding channel.

Thus, the adaptive rate base station transmitter 40 is connected through a downlink channel 48 to the adaptive rate mobile receiver 44 and the adaptive rate mobile station transmitter 46 is connected through an uplink channel 50 to the adaptive rate base station receiver 42. This implementation allows for increased throughput between the base station 26 and the mobile station 38 over both the downlink channel 48 and the uplink channel 50 because of the use of adaptive bandwidth efficient coded modulation schemes. Those interested in a more details of a hardware implementation of a wireless communications systems which may be advantageously employed in accordance with the present invention are referred to commonly assigned U.S. patent application Ser. No. 08/938,031 and entitled "System and Method for Adaptive Modification of Modulated and Coded Schemes in a Communication System", filed on Sep. 21, 1997, the disclosure of which is hereby incorporated by reference.

Figure 3:
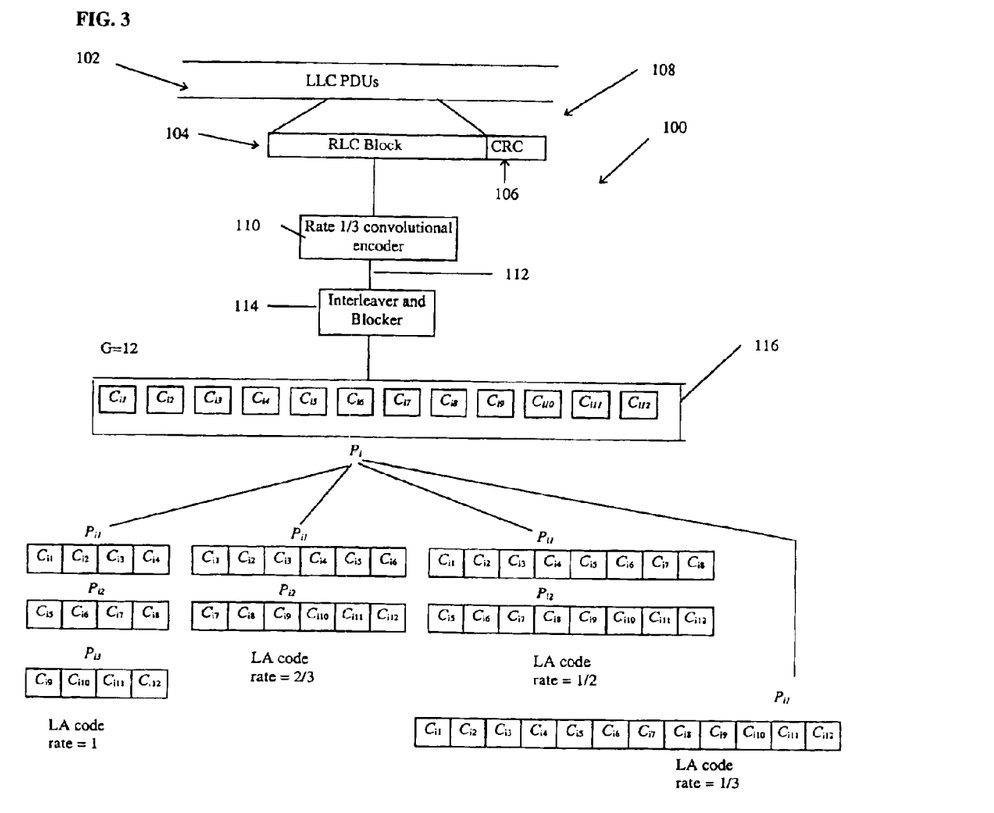
FIG. 3 is a graphical representation of a method for formatting wireless signals for transmission in the system of FIG. 1 in accordance with one aspect of the present invention.
Figure 8:
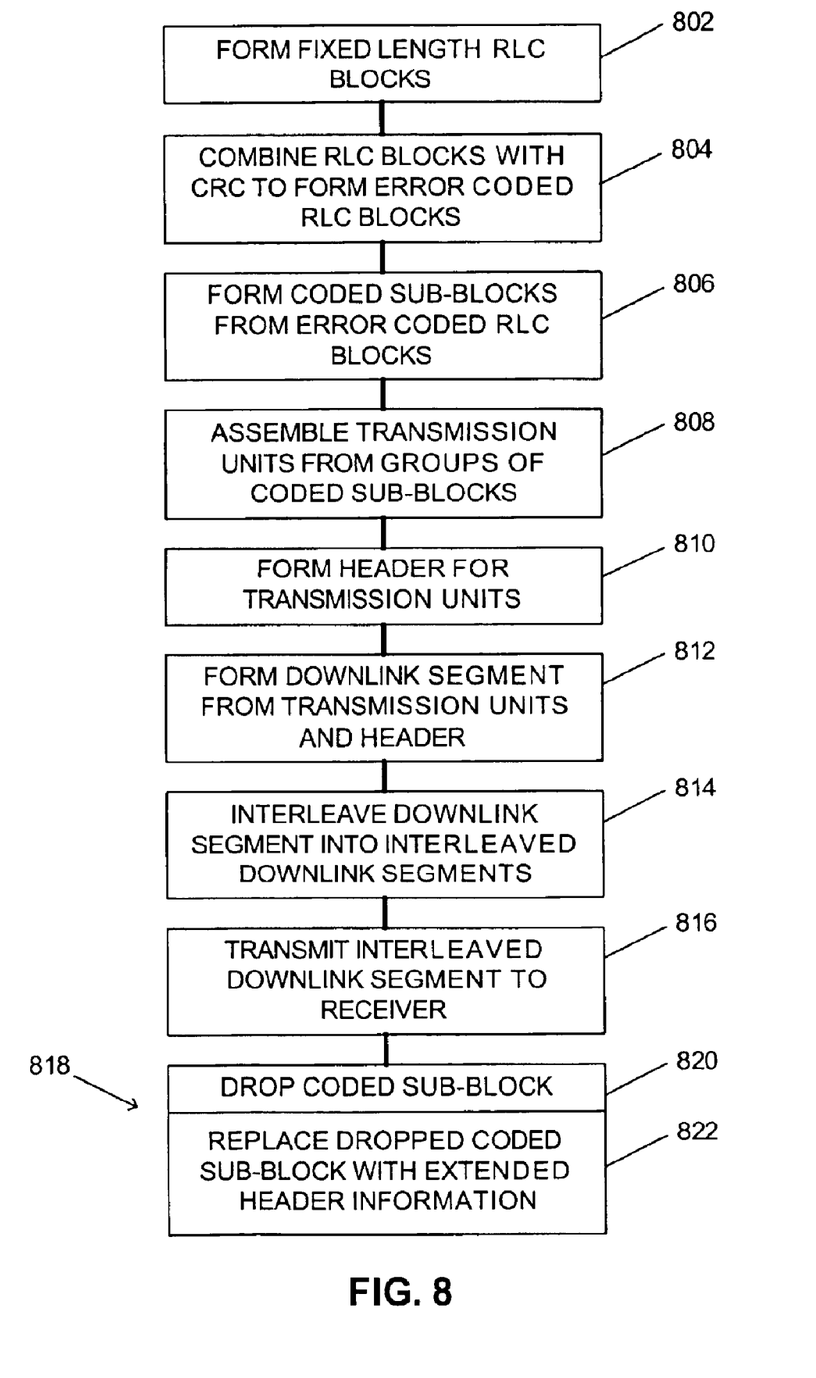
FIG. 8 is a logic flow of exemplary operation of the system for wireless communication of FIG. 1.

Referring now to FIGS. 3, and 8, a method 100 for communicating in a wireless communication system which is adaptable for LA and IR is shown in accordance with the present invention. The adaptive rate base station transmitter and receiver 40 and 42 and the adaptive rate mobile station receiver and transmitter 44 and 46 may be used to implement the method 100 in accordance with the present invention. In the method 100, logical link control (LLC) protocol data units (PDUs) 102 are segmented into fixed length radio link control (RLC) blocks 104 (STEP 802) and a Cyclic Redundancy Check (CRC) sequence 106, which is preferably 12 bits in length, is added to each RLC block 104 (STEP 804). In combination, each RLC block 104 and its associated CRC sequence 106 is designated as an error coded RLC block 108. Each error coded RLC block 108 is encoded preferably using a rate ⅓ convolutional code 110. The output of the encoder, or encoded error coded RLC blocks 112, is interleaved and segmented (STEP 806), shown as block 114, into G Coded Sub-blocks 116 and 120, each coded sub-block being denoted in the figures as $C_{ij}$, j=1, . . . G.

Figure 4:
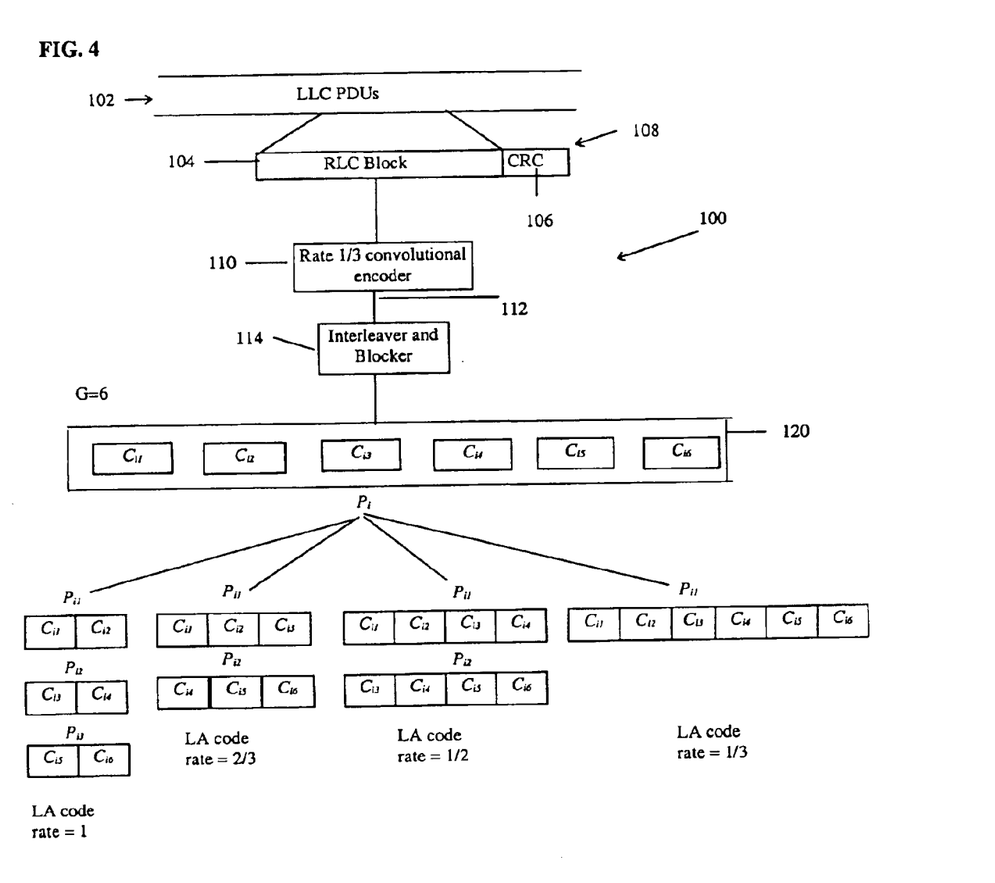
FIG. 4 is a graphical representation of a method for formatting wireless signals for transmission in the system of FIG. 1 in accordance with another aspect of the present invention.

Values of G=12 and 6 are shown in respective FIGS. 3 and 4. Those skilled in the art will readily comprehend with the assistance of this disclosure, that other values for G, such as 18, may be implemented in the present invention. Segmentation into 12 coded sub-blocks 116 (G=12) enables code rates 1, ⅔, ½, ⅓, ⅘ and 4/7. Segmentation into 6 coded sub-blocks 120 (G=6) enables code rates 1, ⅔, ½ and ⅓. As those of ordinary skill in the art will readily appreciate, G=12 offers greater flexibility and efficiency with little, or no increase in complexity. As will be apparent below, the method 100, or transmission scheme, in accordance with one version of the present invention uses IR (D=1) and thus, facilitates operation with or without the use of IR. As will be discussed further with respect to FIGS. 6A and 6B, a Coded sub-block Sequence Number (CSN), which is preferably 12 bits in length, is associated with each coded sub-block $C_{ij}$. A more detailed description of incremental redundancy techniques may be found in commonly assigned U.S. patent application Ser. No. 09/225,910, filed on Jan. 5, 1999 and entitled "System and Method For Incremental Redundancy Transmission In A Communication System", the disclosure of which is hereby incorporated by reference.

Groups of the coded sub-blocks $C_{ij}$ are assembled (STEP 808) to form Transmission Units (TUs), $P_{ik}$ (FIGS. 3 and 4). Depending on the current code rate of the LA scheme, each TU $P_{ik}$ may consist of G/3, G/2, 2G/3 or G consecutive coded sub-blocks associated with the same RLC block, which correspond to code rates of 1, ⅔, ½ and ⅓, respectively. The TUs $P_{ik}$ are preferably of variable size. Thus, for G=6 and for code rates 1, ⅔, ½ and ⅓, the TUs $P_{ik}$ consist of 2, 3, 4, and 6 consecutive coded sub-blocks $C_{ij}$, respectively. If G=12 and for code rates 1, ⅔, ½ and ⅓, the TUs $P_{ik}$ consist of 4, 6, 8, and 12 consecutive coded sub-blocks $C_{ij}$, respectively.

Figure 5:
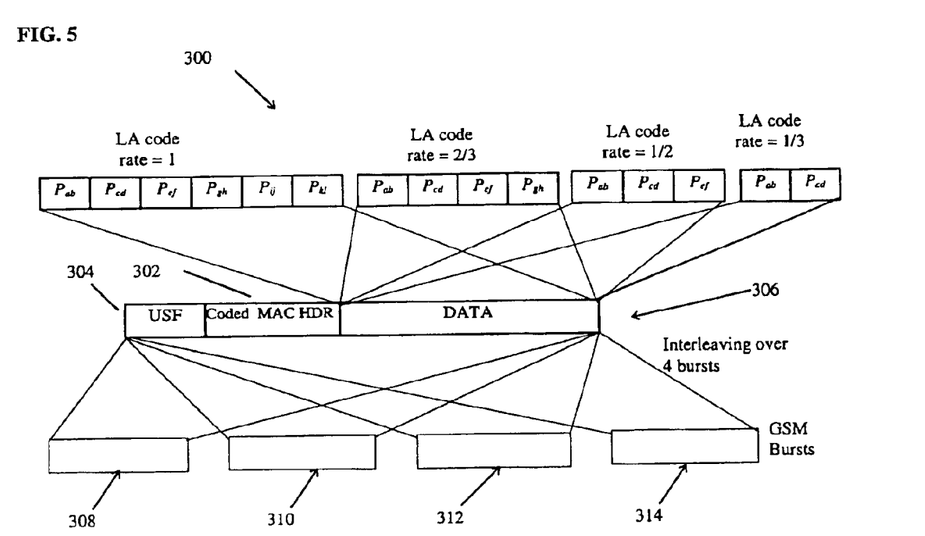
FIG. 5 is a graphical representation of a method for formatting wireless signals for transmission in the system of FIG. 1 in accordance with yet another aspect of the present invention.

As shown in FIG. 5, a method 300, or transmission scheme, is utilized on the downlink. In accordance with the downlink method 300, multiple TUs $P_{ik}$ are combined with a media access control (MAC) header 302 (STEP 810) and an Uplink State Flag (USF) 304 to form a downlink segment 306 (STEP 812). Preferably, one or both of the MAC header 302 and the USF 304 are coded. The downlink segment 306 is interleaved (STEP 814) and transmitted (STEP 816) over four Global System for Mobile Communication (GSM) bursts 308, 310, 312 and 314. The number of TUs transmitted over the four 8-phase shift keyed (8-PSK) GSM bursts 308, 310, 312 and 314 is 6, 4, 3, or 2 for code rates 1, ⅔, ½, or ⅓ respectively.

As noted above, there is a CSN associated with each coded sub-block $C_{ij}$. Each TU includes the CSN for the first coded sub-block $C_{ij}$ in the TU. The TU only needs the CSN for the first coded sub-block, since the remaining coded sub-blocks in the TU are consecutive. For retransmission, the MAC header 302 therefore must explicitly or implicitly identify the CSN for up to 6 TUs. Explicit identification is required due to the fact that during retransmission of data, the data is typically not sent in sequence as it is during its initial transmission.

Figure 6A:
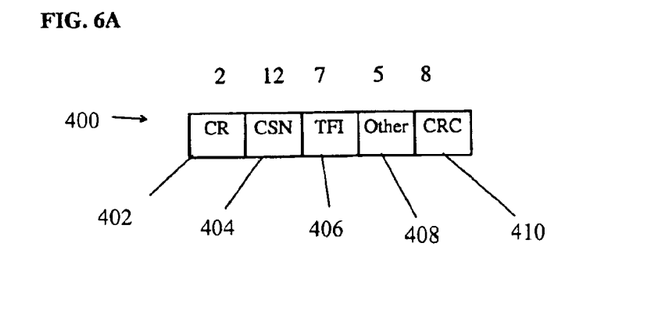
FIG. 6A is a graphical representation of a short header which may be advantageously employed in the present invention.
Figure 6B:
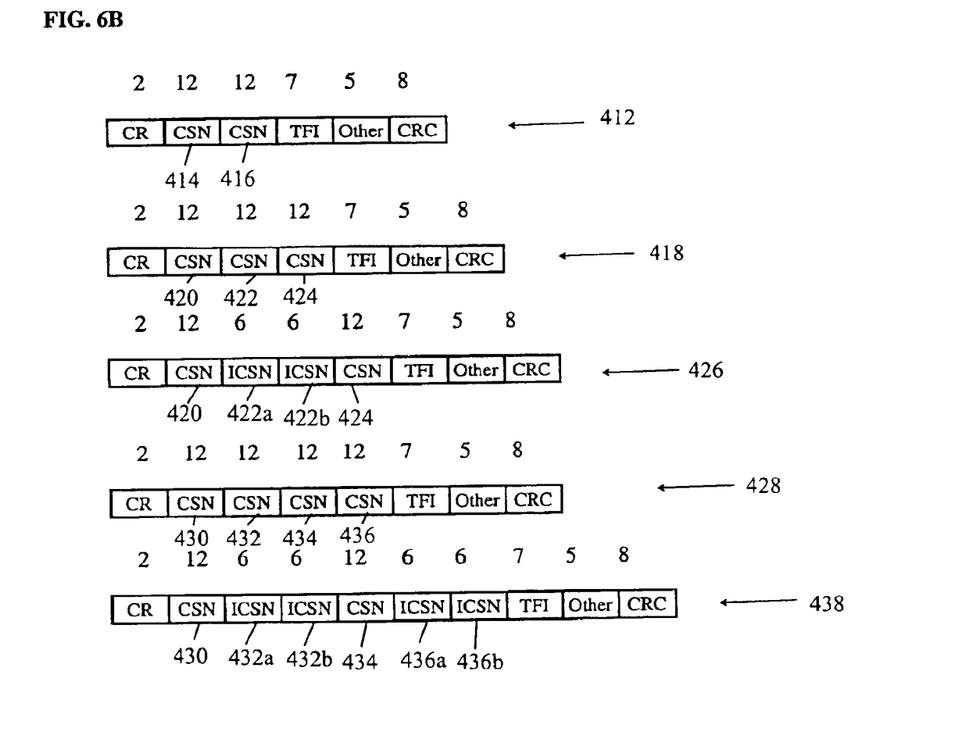
FIG. 6B is a graphical representation of a plurality of extended headers which may be advantageously employed in the present invention.

In accordance with another aspect of the present invention, two schemes, a first scheme for G=12 and a second scheme for G=6 are disclosed for specifying the coded MAC header 302 for 8-PSK. With reference to FIGS. 6A and 6B, the first scheme will now be described.

In EDGE, each TU included in the four GSM bursts must be identified in the coded MAC header. As noted previously, each TU is identified by the CSN of its first coded sub-block $C_{ij}$. The size and the number of TUs are indicated implicitly through the use of a code rate (CR) field in the coded MAC header. When all TUs are consecutive (and thus so are the RLC blocks), there is no need to include several CSNs in the coded MAC header. Therefore, when there are no retransmissions the coded MAC header contains the CSN of the first TU only, and the remaining TUs are assumed to be consecutive. In such a case, the MAC header is designated as a short MAC header.

One example of a short MAC header 400 is shown in FIG. 6A. The short MAC header 400 is comprised of a CR field 402, a CSN field 404, a temporary flow identifier (TFI) field 406, a general Other field 408 and a CRC sequence 410. As those skilled in the will readily understand, the TFI field 406 is used to distinguish between multiple mobile stations in a well known manner. The Other field 408 contains data which is not relevant to the present invention.

The CR field 402 may be preferably encoded as follows:

| CR | Code Rate |
|---|---|
| 00 | 1 |
| 01 | ⅔ |
| 10 | ½ |
| 11 | ⅓ |

Information bits in the short MAC header 400 are protected by the CRC sequence 410, which is preferable 8 bits, for header error detection. The short MAC header 400, shown in FIG. 6A as 34 total bits, is then coded using a punctured rate ⅓ code to obtain 76 bits.

Referring to FIG. 6B, when retransmissions are to be included, additional CSNs need to be contained in the MAC header. In accordance with another aspect of the present invention, a series of extended MAC headers is used to provide these additional CSNs. For example, and not limitation, three types of coded extended MAC headers usable in systems employing LA and systems employing both LA and IR are disclosed.

For clarity and ease of description, fields which are the same as those shown in FIG. 6A will use the same reference numerals. A first extended MAC header format 412 consists of two CSN fields 414 and 416 for a total of 46 uncoded bits. The first extended MAC header format 412 is coded with a punctured rate ⅓ code to 129 bits. The first extended MAC header format 412 can be used for all code rates. A second extended MAC header format 418 consists of three CSN fields 420, 422 and 424 with 58 uncoded bits which are encoded to 129 bits. Different formats are defined for the three code rates 1, ⅔ and ½. The second extended MAC header format 418 is not used with code rate ⅓.

A modified second extended MAC header format 426 is shown in which one of the CSN fields 422 is split into two incremental CSN (ICSN) 422a and 422b. The two ICSN fields 422a and 422b each consist of 6 bits, or half of the 12 bit CSN field 422. The ISCN fields 422a and 422b indicate the increment of the CSN of its associated TU from the previous CSN in the same radio burst.

A third extended MAC header format 428 consists of four CSN fields 430, 432, 434 and 436 having a total of 70 uncoded bits which are then encoded to 129 bits. Different formats are defined for the code rates 1, ⅔. The third extended MAC header format 428 is not used with code rates ½ and ⅓. A modified third extended MAC header format 438 is shown in which the CSN field 432 is split into two ICSN fields 432a and 432b and the CSN field is split into two ICSN fields 436a and 436b.

The first, second and third extended MAC header formats 412, 418 and 428 and the modified second and third extended MAC header formats 426 and 438 are identified through stealing bits. Those skilled in the art will readily appreciate that "stealing bits" is a term of art defined, for example, in the ETSI's standard for GSM. Within the formats 412, 418, 426, 428 and 438, the number and size of the CSN fields are determined by the CR field 402.

The length of the coded first, second and third extended MAC header formats 412, 418, 426, 428 and 438 are each 129 bits. The formats 412, 418, 426, 428 and 438 are designed to accommodate additional CSN fields for retransmissions, as well as varying the amount of coding according to channel conditions. The coded short MAC header 400, which is 76 bits, is augmented (STEP 822) by 53 bits to get the coded extended MAC header formats. The additional 53 bits are obtained by dropping (STEP 820) one coded sub-block from the first TU in the a set of four GSM bursts carrying retransmissions. As will be described, each coded sub-block $C_{ij}$ is 53 bits in length in accordance with the RLC.

As will be appreciated by those skilled in the art, dropping a coded sub-block $C_{ij}$ reduces the code rate for the TU being retransmitted. Consequently, for a code rate ⅔ (=⁴⁄₆) retransmission, dropping a coded sub-block results in the retransmitted TU having a retransmission code rate of ⅘. When the retransmitted TU is soft-combined with the earlier transmission in IR, the resultant rate becomes ⁴⁄₁₁ instead of ⅓ (=⁴⁄₁₂). Accordingly, dropping one of the coded sub-blocks is particularly well-suited for IR. For link adaptation in the uncoded case, it is not possible to drop coded sub-blocks. An entire TU must be dropped to accommodate an extended MAC header. But in the IR case, when one coded sub-block is dropped, we get a retransmission code rate of ⁴⁄₇ instead of a code rate of ½(=⁴⁄₈) after the first retransmission. The coded MAC header format for each EDGE radio burst is indicated to the receiver through stealing bits.

| MAC Header Type (indicated through stealing bits) | MAC Header |
| --- | --- |
| 00 | Coded Short MAC Header (76 bits) |
| 01 | Coded First Extended MAC Header Format (129 bits) |
| 10 | Coded Second Extended MAC Header Format (129 bits) |
| 11 | Coded Third Extended MAC Header Format (129 bits) |

Preferably the coded extended MAC headers can be designed using the following principles. The coding of the short MAC header 400 at code rate ½ or less is sufficient in good channel conditions. In adverse channel conditions, however, the coded MAC header 400 should be better protected with a lower code rate, such as ⅓ or less. At the same time, the number of TUs per EDGE radio burst (and consequently the number of CSN fields to be carried in the MAC header) is smaller when the code rate is ½ or ⅓. Having a smaller number of CSN fields permits better coding of the MAC header using the same number of coded bits (129).

When more than one CSN field is included in a MAC header, each CSN field corresponds to an associated TU in order, except the last CSN field which signifies that the remaining TUs (with no CSN field included in the coded MAC header) are in-sequence. Thus in the first extended MAC header format 412, the first CSN field 414 may correspond to a retransmitted TU and the second CSN field 416 would indicate that the remaining TUs are in sequence starting from the second CSN field 416.

Figure 7:
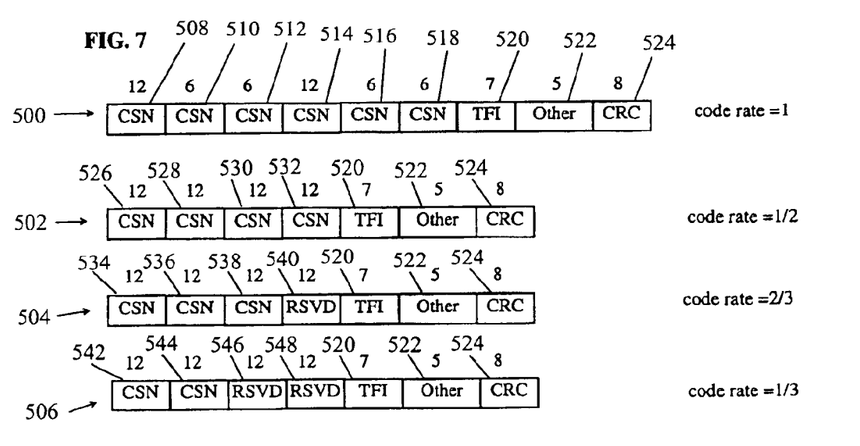
FIG. 7 is a graphical representation of a plurality of extended headers which may be advantageously employed in the present invention.

Referring now to FIG. 7, exemplary extended MAC header formats 500, 502, 504 and 506 are shown for G=6. The MAC header formats 500, 502, 504 and 506 are shown for respective code rates 1, ½, ⅔ and ⅓. For code rate 1, the first extended (G=6) MAC header format 500 is comprised of six consecutive CSN fields 508, 510, 512, 514, 516 and 518. The MAC header 500 further includes a TFI field 520, an Other field 522 and a CRC field 524. Preferably, the CRC field 524 is eight bits for header error detection.

For code rate ½, the second extended (G=6) MAC header 502 is comprised of four consecutive 12 bit CSN fields 526, 528, 530 and 532, the TFI field 520, the Other field 522 and the CRC field 524. For code rate ⅔, the third extended (G=6) MAC header 504 is comprised of three consecutive CSN fields 534, 536 and 538, a reserved field 540, the TFI field 520, the Other field 522 and the CRC field 524. For code rate ⅓, the fourth extended (G=6) MAC header 506 is comprised of two consecutive CSN fields 542 and 544, two reserved fields 546 and 548, the TFI field 520, the Other field 522 and the CRC field 524. Each of the MAC headers 500, 502, 504 and 506 when uncoded contain 68 bits. The MAC headers 500, 502, 504 and 506 are coded using a punctured rate ½ code to obtain 132 bits.

For code rates 1, ⅔, ½ and ⅓, the transmission consists of 6, 4, 3, and 2 TUs, respectively. As described above, each TU is identified by the CSN of its first coded sub-block $C_{ij}$. In the uncoded case, the six TUs are divided into two groups of three TUs. To minimize overhead, the CSN for the first TU in each group is specified and the remaining two are specified as being in 6 bit increments from the first TU. Therefore, the TUs in each group are constrained to have CSNs that differ in fewer than 6 bits.

Advantageously, the present invention enables both link adaptation and incremental redundancy. Since fixed length RLC blocks are used, link adaptation is smooth and simple, and there is no loss of throughput while switching coding schemes. This enables fast link adaptation with no throughput penalty. Since there are only 212 bits per RLC block in the present invention, the RLC block error rate (BLER) is smaller than other known techniques. The present invention provides four code rates in the range of uncoded to rate ⅓. The present invention further allows adaptation between many different code rates with 8-PSK and gaussian minimum shift keying (GMSK) without resegmentation, as required in prior methods.

In accordance with the present invention, it is possible for a transmitter to always operate in the incremental redundancy mode (D=1), independent of receiver operation. Assembly of TUs into physical layer bursts depends only on the code rate being used. The transmitter does not need to know if link adaptation or incremental redundancy mode is used at the receiver.

However, in practice, there is no reason for the transmitter to be unaware of the receiver capability. The transmitter and receiver could exchange this information during the establishment of a temporary block flow. The method of the present invention with G=12 and 6 permits link adaptation and incremental redundancy through one convolutional coder. By implementing the present invention, it may be possible that retransmissions could consist of fewer coded sub-blocks than the original transmission when the receiver uses IR.

For the method disclosed in FIG. 1, the peak throughput has been computed as follows. There are 1384 bits per 8-PSK PDU (interleaved over 4 GSM bursts). The CRC overhead is 72 bits (since 6 uncoded RLC blocks may be transmitted over EDGE radio bursts). The USF field and the coded short MAC header comprise 36 and 84 bits, respectively. Accordingly, each RLC/MAC block contains (1384−36−72−76)/6=200 LLC data bits. The peak throughput can therefore be calculated as (200 bits/RLC block*6 RLC blocks)/20 ms=60 kbps.

Retransmissions in the uncoded case with IR result in a code rate of 4/7 after the first retransmission. In the absence of soft-combining, it is assumed that in the uncoded case, only 5 RLC blocks are transmitted in a set of four GSM bursts carrying retransmissions. However, those skilled in the art will readily comprehend with the benefit of this disclosure, that other coded short MAC header formats that accommodate two CSNs within the 76 coded bits may be devised. This is possible because uncoded operation without soft-combining can occur only under very good channels which would allow the short MAC header to be coded at rate ⅔.

As those skilled in the art will readily appreciate, systems for implementing GSM, in general, and GPRS and EDGE capabilities are well known in the art Since the structure and philosophy of these systems are not important to the present invention beyond the generation, transmission and receipt of wireless communication signals, details of such systems will not be further disclosed herein. Those desiring additional information regarding such systems are referred to U.S. Pat. No. 5,729,536, entitled "Cellular System Architectures Supporting Data Services", the disclosure of which is hereby incorporated herein by reference.

A system and method is provided for communicating in a wireless communication system which supports link adaptation or link adaptation and incremental redundancy. The invention provides link adaptation at multiple code rate by dividing fixed length RLC blocks 104 into coded sub-blocks ("$C_{ij}$"; STEP 806). CRC code 106 may be appended to the RLC blocks 104 for error detection (STEP 804). The sub-blocks $C_{ij}$ are then grouped into transmission units $P_{ik}$ for transmission (STEP 808). The number of sub-blocks $C_{ij}$ in each group is varied to provide multiple code rates. Headers 400 are used to identify the transmission units being transmitted. In the case of retransmission, the transmission units may be expressly identified through extended headers 412, 418, 426, 428, 438, 500, 502, 504, and/or 506. One or more of the originally transmitted sub-blocks $C_{ij}$ are dropped (STEP 820) and replaced (STEP 822) by the extended headers 412, 418, 426, 428, 438, 500, 502, 504, and/or 506 in the retransmission. Accordingly, the present invention provides for a retransmission code rate which may be different from the code rate at which the transmission units were originally transmitted.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modification, equivalents and alternatives falling within the spirit and scope of the invention as defined by the following appended claims.

What is claimed is:

1. A wireless communication system being capable of supporting link adaptation comprising:
    a transmitter for forming fixed length radio link control (RLC) blocks, for forming fixed length coded sub-blocks from the RLC blocks, for configuring the coded sub-blocks into transmission units being capable of supporting link adaptation at multiple code rates, for forming a downlink segment from the transmission units, for interleaving the downlink segment into an interleaved downlink segment, and for transmitting the interleaved downlink segment, wherein the transmitter comprises an adaptive rate transmitter for retransmitting at least one of the RLC blocks at a code rate which is different from the code rate used for an initial transmission of the at least one of the RLC blocks, wherein the adaptive rate transmitter retransmits only a first portion of a transmission unit that comprises the at least one RLC blocks and integer number of the coded sub-blocks, wherein the adaptive rate transmitter replaces a second portion of the transmission unit by an extended header information; and
    a receiver for receiving the downlink segment, for obtaining the transmission units from the downlink segment, and for decoding the RLC blocks from the transmission units.

2. The wireless communication system as recited in claim 1, wherein the adaptive rate transmitter retransmits the at least one of the RLC blocks in a transmission unit which is different than the transmission unit in which the at least one of the RLC blocks was initially transmitted.

3. The wireless communication system as recited in claim 1, wherein the adaptive rate transmitter retransmits a transmission unit comprised of coded sub-blocks which have not been transmitted previously.

4. The wireless communication system as recited in claim 1, wherein the transmitter adds cyclic redundancy check sequences to the RLC blocks to form error coded RLC blocks which are configured into the coded sub-blocks.

5. The wireless communication system as recited in claim 1, wherein the adaptive rate transmitter forms the coded sub-blocks by dividing the RLC blocks by a variable value.

6. The wireless communication system of claim 1, wherein the adaptive rate transmitter drops the second portion of the transmission unit;
    wherein the adaptive rate transmitter replaces the second portion of the transmission unit with the extended header information.

7. The wireless communication system of claim 1, wherein the transmission unit comprises only the first portion and the second portion.

8. A wireless communication system being capable of supporting link adaptation comprising:
    a transmitter for forming fixed length radio link control (RLC) blocks, for forming fixed length coded sub-blocks from the RLC blocks, for configuring the coded sub-blocks into transmission units being capable of supporting link adaptation at multiple code rates, for forming a downlink segment from the transmission units, for interleaving the downlink segment into an interleaved downlink segment, and for transmitting the interleaved downlink segment, wherein the transmitter comprises an adaptive rate transmitter for transmitting the transmission units to a receiver at a retransmission code rate which is different than the code rate at which the transmission units were transmitted and forming the coded sub-blocks by dividing the RLC blocks by a variable value, wherein the variable value is one of 6, 12 and 18.

9. A method for communicating in a wireless communication system being capable of supporting link adaptation at multiple code rates, the method comprising the steps of:
    forming fixed length radio link control (RLC) blocks;
    configuring the RLC blocks into transmission units being capable of supporting link adaptation at multiple code rates, wherein the step of configuring comprises the steps of:
        adding cyclic redundancy check (CRC) sequences to the RLC blocks;
        performing convolutional coding on the RLC blocks and the CRC sequences to generate encoded RLC blocks;
        segmenting the encoded RLC blocks into G coded sub-blocks, wherein groups of the coded sub-blocks are assembled to form the transmission units;
    forming a downlink segment from the transmission units, wherein G is equal to one of 6, 12 and 18;
    interleaving the downlink segment into an interleaved downlink segment; and
    transmitting the interleaved downlink segment.

10. The method as recited in claim 9, wherein the step of performing convolutional coding uses a convolutional code rate of 1/3.

11. The method as recited in claim 9, wherein the step of configuring comprises the step of interleaving the encoded RLC blocks.

12. The method as recited in claim 9, wherein the step of transmitting comprises the step of transmitting the interleaved downlink segment over GSM bursts.

13. The method as recited in claim 9, wherein the step of configuring comprises the step of forming the transmission units using different numbers of the coded sub-blocks to obtain multiple code rates for the link adaptation.

14. The method as recited in claim 9, wherein the step of configuring comprises the step of using different transmission units for an initial transmission and for a retransmission of the RLC blocks.

15. The method as recited in claim 9, wherein the step of configuring comprises the step of using only a portion of one of the transmission units for a retransmission of the RLC blocks.

16. The method as recited in claim 9 wherein the step of forming the downlink segment comprises the steps of:
  forming a header indicative of the transmission units to be transmitted; and
  forming the downlink segment from the transmission units and the header.

17. The method as recited in claim 16 wherein the header is transmitted along with the transmission units.

18. The method as recited in claim 16 wherein the step of forming the header comprises the step of providing, in the header, at least one coded sub-block sequence number associated with at least one of the coded sub-blocks in the transmission units to be transmitted.

19. The method as recited in claim 16 wherein the step of forming the header comprises the step of providing in the header a code rate field indicative of the size and number of the transmission units to be transmitted.

20. The method as recited in claim 16 wherein the step of forming the header comprises the step of providing in the header a temporary flow identifier indicative of which receiver should receive the transmission units or which transmitter has sent the transmission units.

21. The method as recited in claim 9, wherein the step of configuring comprises the step of forming at least two of the transmission units of an unequal number of coded sub-blocks.

22. The method as recited in claim 9, wherein the step of transmitting comprises the step of transmitting the interleaved downlink segment over a general packet radio services system.

23. A method for communicating in a wireless communication system being capable of supporting link adaptation at multiple code rates, the method comprising the steps of:
  forming fixed length radio link control (RLC) blocks;
  configuring the RLC blocks into transmission units being capable of supporting link adaptation at multiple code rates, wherein the step of configuring comprises the steps of:
    adding cyclic redundancy check (CRC) sequences to the RLC blocks;
    performing convolutional coding on the RLC blocks and the CRC sequences to generate encoded RLC blocks;
    segmenting the encoded RLC blocks into G coded sub-blocks, wherein groups of the coded sub-blocks are assembled to form the transmission units;
    using only a first portion of one of the transmission units for a retransmission of the RLC blocks, wherein the step of using only the first portion comprises the steps of using an integer number of the coded sub-blocks to form the first portion of the one of the transmission units used for the retransmission of the RLC blocks and replacing a second portion of one of the transmission units by an extended header information;
  forming a downlink segment from the transmission units;
  interleaving the downlink segment into an interleaved downlink segment; and
  transmitting the interleaved downlink segment.

24. The method as recited in claim 23 wherein the step of using the integer number comprises the step of using coded sub-blocks which have not been transmitted earlier.

25. The method of claim 23, wherein the step of using only the first portions of one of the transmission units for the retransmission of the RLC blocks comprises the steps of:
  dropping one or more of the coded sub-blocks of the transmission units;
  adding the extended header information in place of the one or more of the coded sub-blocks of the transmission units.

26. The wireless communication system of claim 23, wherein the one of the transmission units comprises only the first portion and the second portion.

27. A method for communicating in a wireless communication system being capable of supporting link adaptation between multiple code rates and incremental redundancy, the method comprising the steps of:
  forming fixed length radio link control (RLC) blocks;
  combining the RLC blocks with a cyclic redundancy check sequence for error detection to form error coded RLC blocks;
  processing the error coded RLC blocks to form coded sub-blocks;
  assembling groups of the coded sub-blocks into transmission units based on the multiple code rates;
  forming a header indicative of the transmission units;
  forming a downlink segment from the transmission units and the header;
  interleaving the downlink segment into an interleaved downlink segment;
  transmitting the interleaved downlink segment to a receiver; and
  retransmitting at least one of the RLC blocks at a code rate which is different from the code rate used for an initial transmission of the at least one of the RLC blocks, wherein the step of retransmitting comprises the steps of:
    dropping one of the coded sub-blocks when retransmitting the transmission units; and
    replacing the dropped one of the coded sub-blocks with an extended header information in the retransmitted transmission units.

28. The method as recited in claim 27, wherein the step of processing the error coded RLC blocks comprises the steps of:
  performing a convolutional coding on the error coded RLC blocks to generate encoded RLC blocks; and
  forming the coded sub-blocks from the encoded RLC blocks.

29. The method as recited in claim 28 wherein the step of performing the convolutional coding using convolutional code rate of $1/3$.

30. The method as recited in claim 28 wherein the step of forming the coded sub-blocks comprises the step of interleaving the encoded RLC blocks.

31. The method as recited in claim 30 wherein the step of forming the coded sub-blocks comprises the step of:
  segmenting the interleaved encoded RLC blocks into G coded sub-blocks and,
  wherein groups of the coded sub-blocks are assembled to form the transmission units.

32. The method as recited in claim 31 wherein the step of transmitting comprises the step of transmitting the interleaved downlink segment over GSM bursts.

33. The method as recited in claim 31 wherein at least two of the transmission units have a different number of coded sub-blocks.

34. The method as recited in claim 33 wherein the transmission units are modulated using phase shift keying.

35. The method as recited in claim 33 wherein the transmission units are modulated using gaussian minimum shift keying.

36. The method as recited in claim 27 wherein the step of replacing comprises the step of:
   providing a coded sub-block sequence number in the extended header information.

37. The method of claim 27, wherein the step of replacing the dropped one of the coded sub-blocks with the extended header information in the retransmitted transmission units comprises the step of:
   adding the extended header information in place of the dropped one of the coded sub-blocks.

* * * * *